US005769913A

United States Patent [19]

Gallego Juarez et al.

[11] Patent Number: 5,769,913

[45] Date of Patent: Jun. 23, 1998

[54] MULTIFREQUENCY ACOUSTIC CHAMBER FOR THE AGGLOMERATION AND SEPARATION OF PARTICLES SUSPENDED IN GASEOUS EFFLUENTS

[75] Inventors: Juan A. Gallego Juarez; Enrique Riera Franco de Sarabia; German Rodriguez Corral, all of madrid, Spain

[73] Assignee: Consejo Superior Investigaciones Cientificas, Madrid, Spain

[21] Appl. No.: 834,619

[22] Filed: Apr. 14, 1997

Related U.S. Application Data

[63] Continuation of Ser. No. 351,024, filed as PCT/ES94/00026, Mar. 11, 1994, abandoned.

[30] Foreign Application Priority Data

Mar. 11, 1993 [ES] Spain .................................... 9300507

[51] Int. Cl.$^{6}$ ..................................................... B01D 51/08

[52] U.S. Cl. .................................................. 55/277; 95/29

[58] Field of Search ................................................ 55/277

[56] References Cited

U.S. PATENT DOCUMENTS

| | | | |
|---|---|---|---|
| 3,771,286 | 11/1973 | Scott | 55/277 |
| 4,475,921 | 10/1984 | Barmatz | 55/277 |

FOREIGN PATENT DOCUMENTS

| | | |
|---|---|---|
| 450 030 | 10/1991 | European Pat. Off. . |
| 488 097 | 6/1992 | European Pat. Off. . |
| 2 304 597 | 8/1974 | Germany . |

*Primary Examiner*—David W. Wu
*Attorney, Agent, or Firm*—Darby & Darby

[57] ABSTRACT

The objective of the present patent is an acoustic chamber for treatment of gaseous effluents containing solid and liquid micro-particles in suspension at various frequencies and high intensities. The acoustic energy agglomerates the micro-particles, thereby facilitating their separation by means of conventional systems (electrostatic filters, cyclones, etc.). The chamber has a rectangular cross section and is axially traversed by the flow of the aerosols to be agglomerated (1), while the acoustic generators, being of vibrating-stepped-plate type (2) and being able to work at different frequencies, are arranged contiguously or alternatingly on the side walls to create intensive stationary fields in the various transversal sections of the chamber. To take advantage of the emissions from both faces of the acoustic generator's radiating plate, it is proposed to locate it in between of two planar reflectors which form an angle. Likewise, for the aerosol treatment at high temperatures a refrigeration system (4) for the acoustic radiators is proposed by means of a cool air flow.

20 Claims, 2 Drawing Sheets

MULTIFREQUENCY ACOUSTIC CHAMBER FOR THE AGGLOMERATION AND SEPARATION OF PARTICLES SUSPENDED IN GASEOUS EFFLUENTS

This is a continuation of international application Ser. No. PCT/ES94/00026, filed Mar. 11, 1994.

FIELD OF THE INVENTION

The present invention pertains to multifrequency acoustic chambers for the agglomeration and separation of particles suspended in gaseous effluents.

BACKGROUND OF THE INVENTION

Particles suspended in gases coming from industrial emissions or from the exhausts of internal combustion engines constitute one of the factors with the greatest impact on atmospheric contamination. More specifically, the very fine particles (smaller 5 microns) which are very difficult to eliminate with conventional separation technologies represent a major health hazard because of their penetration and adhesion ability to respiratory tissue as well as for their general toxicity. At this time, efficient industrial emission control of particulate matter is only possible down to particle sizes in the order of some microns by means of electrostatic filters.

Acoustic energy offers a new method for elimination of micron- and submicron-sized particles. The Spanish Patent 439.523 indicates how the application of a high intensity acoustic field with an appropriate frequency in an aerosol gives raise to an agglomeration processes of the particles, which form the aerosol, increasing their size to facilitate in this way their later precipitation or separation in a conventional or gravity collector. The process takes advantage of the effects of vibration, hydrodynamic interaction, and entrainment which are produced between the particles by the action of the acoustic field.

The object of the present patent refers to an acoustic chamber for treatment of gaseous effluents which contain solid or liquid particles in suspension. There are some precedents of equipment of this type. The Spanish Patent 459.523 presents a cylindrical chamber of which one end incorporates an acoustic emitter of radiating-stepped-plate type and the other one a plane reflector paralleling the face side of the emitter. The aerosol to be treated is introduced tangentially and it carries out a helicoidial course which, even though favoring the particle agglomeration, introduces load losses and provokes turbulent flow.

The European patent EP-A-488,097 presents a new chamber type of polygonal cross section in which the aerosol enters axially while the acoustic emitter or emitters (whose type is not specified) are located at an oblique angle with respect to the chamber axis. This way, the acoustic radiation is repetitively reflected on the chamber walls until it falls, on the other end of the chamber, onto a plane reflector which is also located at an oblique position with respect to the axis. This oblique incidence, however, can favor the excitation of multiple modes which can produce energy dispersion between the principal axial mode and the different transversal modes. On the other hand, with the use of several acoustic sources of equal frequency within the same chamber section one risks to produce negative interferences by generating the acoustic field.

Both inventions try to take advantage of the maximum axial length of the chamber and of the application of a single operating frequency. Cooling devices for the acoustic emitters, which permit the operation with gases at high temperatures, are proposed in none of these systems.

OBJECT AND SUMMARY OF THE INVENTION

The object of the present invention is a new chamber type with a polygonal cross-section such as a rectangular cross section based on the application of high acoustic energy levels by means of emitters such as radiating-stepped-plate type generators (European Patent EP450030A1) which treat an aerosol flow, throughout its passing-by, in direction perpendicular to the propagation (FIG. 1). In this manner, the gases to be treated will flow in a straight line along the chamber axis, indicated by Arrow 1, while the emitters (2), which can be of different frequencies, will be distributed on the side walls to create intensive stationary fields which will cover the treatment chamber from end to end in all its different sections without leaving extensive zones at low acoustic levels. The chamber walls opposing the emitters will function as reflectors. The transducer support implements an adjustment device (3) which permits the variation of the radiator-reflector distance to achieve an optimum stationary field. By letting every acoustic emitter act on the width of the chamber (instead of on the length, as done in the former mentioned inventions) one will need to cover smaller distances and so one will be able to achieve a higher intensity as well as a better homogeneity of the acoustic field, since generally one will work in the nearfield of the emission where the beam maintains practically parallel.

The possibility to apply different frequencies along the flow path is very important since, because of the existence of an optimum agglomeration frequency for each particle size, the change of the size distribution through the process itself requires a change of the treatment frequency.

DETAILED DESCRIPTION

Figure 1:
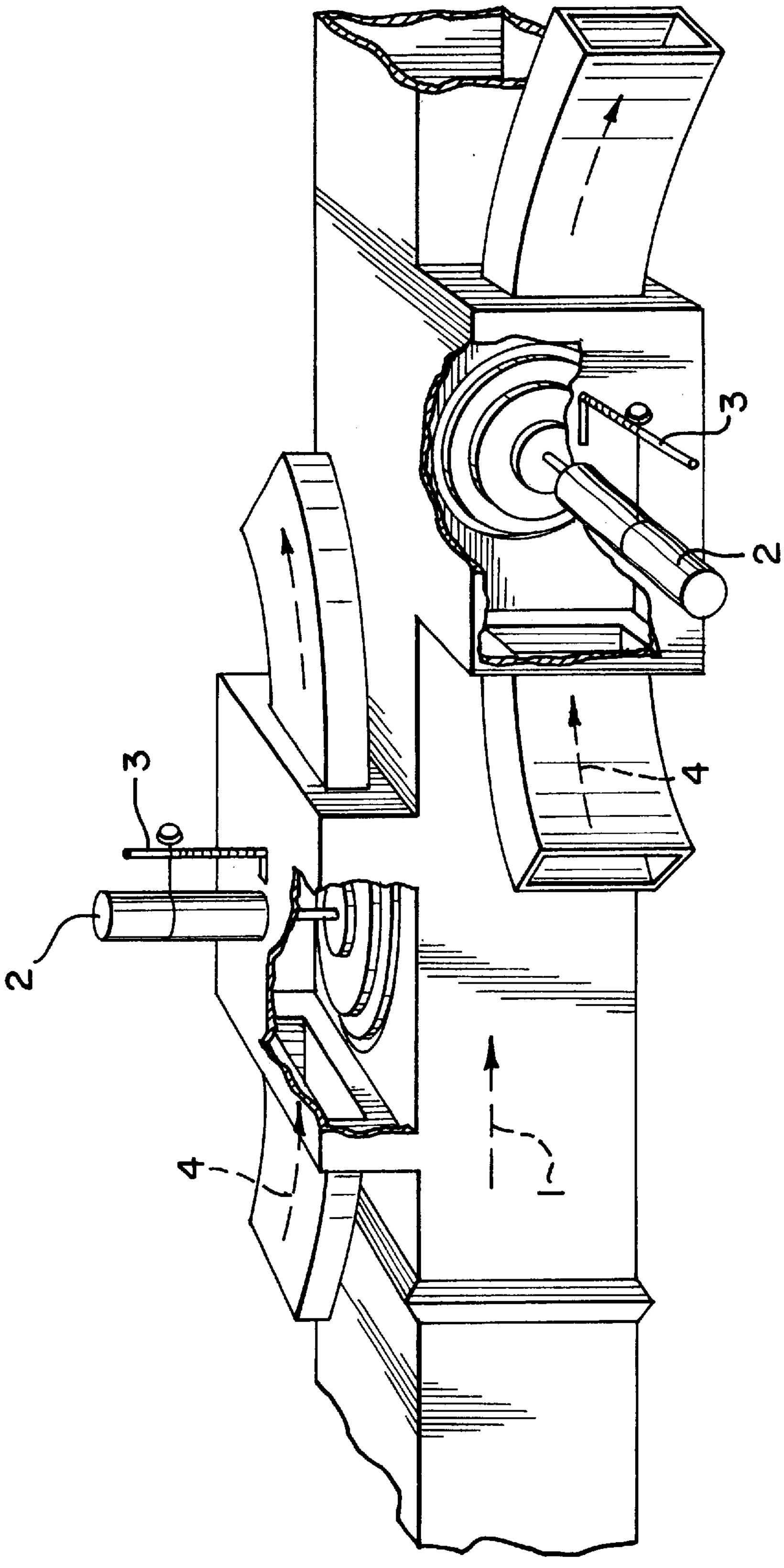
FIG. 1 illustrates schematically a first embodiment of the multifrequency acoustic chamber of the present invention.

In FIG. 1, where following the present invention a scheme of the acoustic chamber for aerosol treatment is presented, it is also proposed to include a cooling system for the transducers for their use in treatment of high temperature gases. This system is based on the introduction of a cold or ambient temperature air flow (at the level of the radiating plate) which acts as a gaseous curtain separating the acoustic emitter and the high temperature aerosol. This way, a temperature gradient is produced which not only serves to thermally protect the emitter but also, in addition, to produce a gradual effect of impedance adaptation between the radiator and the medium. Such a system might be required for those industrial applications in which the gaseous effluents proceeding combustion processes are emitted at temperatures in the order of 150° C. or even higher.

Figure 2:
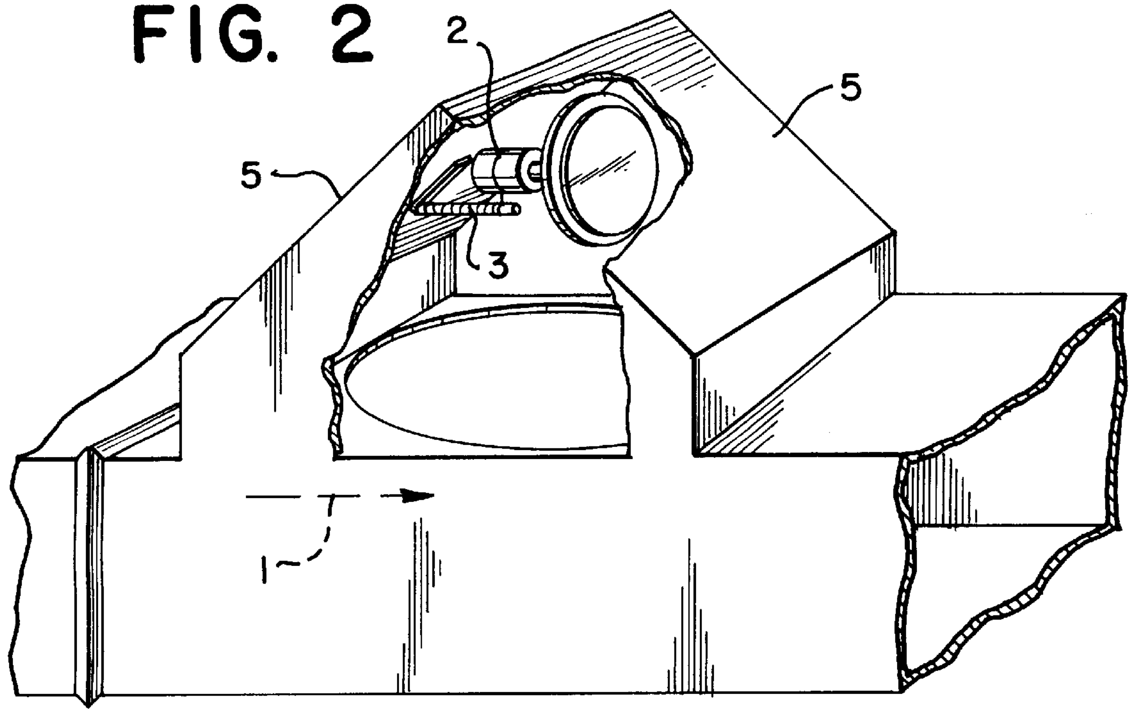
FIG. 2 illustrates schematically a second embodiment of the multifrequency acoustic chamber of the present invention.
Figure 3:
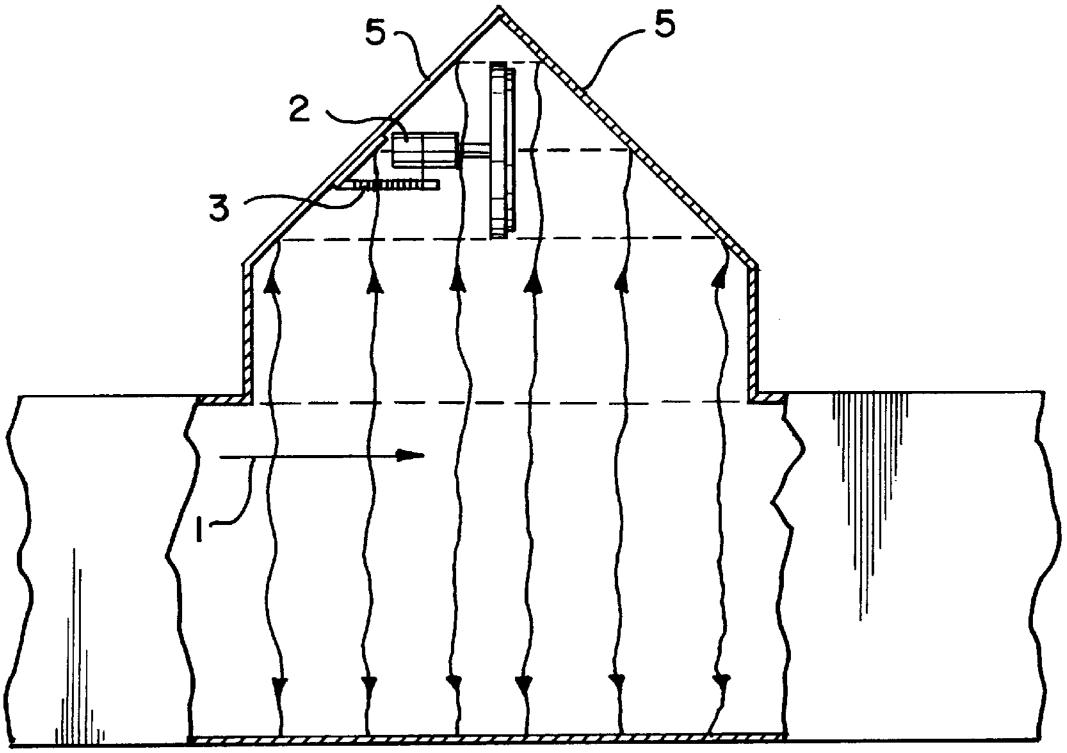
FIG. 3 is a sectional view of a stationary field generated by an acoustic emitter of the second embodiment of the present invention.

As said before, the acoustic emitters to be used in the proposed chamber are of type "plate radiator with stepped profile." One arrangement of the acoustic emitters in the multifrequency acoustic chamber has provides emitters with a radiator plate including a front side, with the emitters disposed so as to emit directly from the front side of the radiator plate into the flow path. In the arrangement shown in FIG. 1, the emission from the plate's backside is not taken advantage of for the agglomeration process, except in the case if the mentioned plate is completely introduced in the interior of the treatment chamber. An arrangement with which the mentioned backside radiation could be realized is presented in FIG. 2. The transducer (2) is located with its axis parallel to that of the chamber in a way that the radiating plate is situated in between of two reflector plates (5), which form an angle such that the forward as well as the backward radiation can be reflected and normally directed into the gas stream which is flowing along the treatment chamber (FIG. 3). Like this, one obtains an efficient use of the total radiated energy of the emitter. It is to say, however, that this arrangement implies major difficulties on the adjustment and realization of an optimum stationary wave.

As an example, we can show that with 150 W power a 20 kHz transducer, located with its axis parallel to that of the chamber in between of two plane reflectors which form a 90° angle and are positioned at a 45° angle with respect to the radiating plate, achieves, in a chamber with a cross section of 140×60 cm, acoustic pressure levels higher than the 150 dB which are necessary for rapid generation of the acoustic agglomeration phenomenon. Without taking advantage of the backside radiation by means of reflectors, the mentioned pressure levels are reached with applied powers in the order of 200 W.

In a rectangular chamber with a cross section of 0,5×0,5 m and a length of about 2 m it is possible to treat aerosol flows of from 1000 to 2000 $m^3/h$ by applying four radiating plate transducers with diameters of 48 cm and radiated acoustic powers in the order of 300 W/unit. The transducers are located as groups along one of the chamber walls or alternatingly as shown in FIG. 1. If the backside radiation is not taking advantage of by abstaining from using angled reflectors with the radiators, the effective acoustic potential is approximately one half of the radiated one, that is to say in the order of 150 W/unit. This means that the total power applied to the aerosol on its run throughout the treatment chamber is about 600 W. The intensity levels achieved in the interior of the chamber are higher than 160 dB. This way, one achieves, with frequencies of 20 kHz for aerosols with initial particles from 0,2 to 2 microns and concentrations from 0,1 to 4 $g/m^3$, enlargement of an order of magnitude. That is to say, the mean size grows from one to ten microns. This increase is decisive for the subsequent application of an electrostatic filter to the aerosol flow, since these filters are generally efficient from 5 microns on.

What is claimed:

1. A multifrequency acoustic chamber for agglomeration and separation of particles suspended in gaseous effluents, comprising:

walls, each of said walls facing an opposed parallel wall, said walls defining a polygonal transverse cross section such that acoustic radiation emitted orthogonally from one of said walls will fall orthogonally on a surface of said opposed parallel wall and be reflected by said opposed wall, giving rise to the generation of a stationary acoustic field;

said chamber having an input end and an output end, said walls defining a flow path therebetween for the gaseous effluents from said input end to said output end;

a plurality of acoustic emitters for emitting acoustic radiation having a pressure level greater than 150 dB within said chamber, said emitters being along said flow path, each of said acoustic emitters emitting radiation at a predetermined frequency in a direction orthogonal to said walls, the emitted radiation of some of said emitters being different than others, and the emission frequency of each of said emitters being related to the position of that emitter along said flow path, whereby a frequency distribution of acoustic radiation is provided along said flow path in relationship to the change of size distribution of the particles in the gaseous effluents due to the acoustic agglomeration process.

2. The multifrequency acoustic chamber as in claim 1, wherein said emitters have a radiator plate including a front side, said emitters being disposed so as to emit directly from the front side of said radiator plate into said flow path.

3. The multifrequency acoustic chamber as in claim 1, wherein said emitters have a radiator plate including a front side and a back side, and wherein said chamber further comprises plane reflectors located on opposite sides of said radiator plate of each of said emitters and forming an angle thereto such that radiation from the front and back sides of each of said radiator plates is reflected by said plane reflectors and directed into said flow path in an orthogonal direction with respect to said walls.

4. The multifrequency acoustic chamber as in claim 3, further comprising an adjustment means for adjusting the position of said radiator plates with respect to said plane reflectors.

5. The multifrequency acoustic chamber as in claim 1, further comprising a cooling system, said cooling system including means for providing a laminar flow of cool air to separate the acoustic emitter from gaseous effluents passing along the flow path.

6. The multifrequency acoustic chamber as in claim 1, wherein said emitters are placed along said walls as contiguous units or groups.

7. The multifrequency acoustic chamber as in claim 1, wherein said emitters are placed on alternating ones of said walls.

8. The multifrequency acoustic chamber as in claim 1, wherein said emitters are radiating-stepped-plate acoustic emitters.

9. The multifrequency acoustic chamber as in claim 1, wherein said polygonal transverse cross section is a rectangular transverse cross section.

10. The multifrequency acoustic chamber as in claim 1, wherein said emitters are distributed and positioned along said flow path to emit acoustic radiation, the radiation maintaining the acoustic pressure level within the chamber relatively free of low acoustic level zones.

11. The multifrequency acoustic chamber as in claim 1, wherein the flow path within the chamber is linear between said input end and said output end.

12. A multifrequency acoustic chamber for agglomeration and separation of particles suspended in gaseous effluents, comprising:

walls, each of said walls facing an opposed parallel wall, said walls defining a polygonal transverse cross section such that acoustic radiation emitted orthogonally from one of said walls will fall orthogonally on a surface of said opposed parallel wall and be reflected by said opposed wall, giving rise to the generation of a stationary acoustic field;

chamber having an input end and an output end, said walls defining a flow path therebetween for the gaseous effluents from said input end to said output end;

a plurality of acoustic emitters for emitting acoustic radiation having a pressure level greater than 150 dB within said chamber, said emitters being along said flow path, each of said acoustic emitters emitting radiation at a different predetermined frequency in a direction orthogonal to said walls, the emission frequency of each of said emitters being related to the position of that emitter along said flow path, whereby a frequency distribution of acoustic radiation is provided along said flow path in relationship to the change of size distribution of the particles in the gaseous effluents due to the acoustic agglomeration process.

13. The multifrequency acoustic chamber as in claim 12, wherein said emitters have a radiator plate including a front side, said emitters being disposed so as to emit directly from the front side of said radiator plate into said flow path.

14. The multifrequency acoustic chamber as in claim 12, further comprising a cooling system, said cooling system including means for providing a laminar flow of cool air to separate the acoustic emitter from gaseous effluents passing along the flow path.

15. The multifrequency acoustic chamber as in claim 12, wherein said emitters are placed along said walls as contiguous units or groups.

16. The multifrequency acoustic unit as in claim 12, wherein said emitters are placed on alternating ones of said walls.

17. The multifrequency acoustic chamber as in claim 12 wherein said emitters are radiating-stepped-plate acoustic emitters.

18. The multifrequency acoustic chamber as in claim 12, wherein said polygonal transverse cross section is a rectangular transverse cross section.

19. The multifrequency acoustic chamber as in claim 12, wherein said emitters are distributed and positioned along said flow path to emit acoustic radiation, the radiation maintaining the acoustic pressure level within the chamber relatively free of low acoustic level zones.

20. The multifrequency acoustic chamber as in claim 12, wherein the flow path within the chamber is linear between said input end and said output end.

* * * * *